United States Patent
Sugashima et al.

(10) Patent No.: US 11,140,052 B2
(45) Date of Patent: Oct. 5, 2021

(54) ELECTRONIC CONTROL UNIT, NON-TRANSITORY TANGIBLE COMPUTER READABLE MEDIUM, AND ANOMALY DETECTION METHOD

(71) Applicant: DENSO CORPORATION, Kariya (JP)

(72) Inventors: Takeshi Sugashima, Kariya (JP); Keiichi Bando, Kariya (JP); Shunsaku Nakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/912,804

(22) Filed: Jun. 26, 2020

(65) Prior Publication Data

US 2021/0006479 A1 Jan. 7, 2021

(30) Foreign Application Priority Data

Jul. 3, 2019 (JP) .............................. JP2019-124675

(51) Int. Cl.
*H04L 12/26* (2006.01)
*H04L 12/40* (2006.01)

(52) U.S. Cl.
CPC ...... *H04L 43/062* (2013.01); *H04L 12/40026* (2013.01); *H04L 43/04* (2013.01); *H04L 43/16* (2013.01); *H04L 2012/40215* (2013.01); *H04L 2012/40273* (2013.01)

(58) Field of Classification Search
CPC . H04L 43/062; H04L 12/40026; H04L 43/04; H04L 43/16; H04L 2012/40215; H04L 2012/40273
See application file for complete search history.

(56) References Cited

U.S. PATENT DOCUMENTS

| 10,902,109 | B2 * | 1/2021 | Kishikawa | .......... H04L 63/1416 |
| 10,911,182 | B2 * | 2/2021 | Kishikawa | ............. G07C 5/085 |
| 10,986,008 | B2 * | 4/2021 | Ujiie | ....................... G06F 21/85 |
| 10,992,688 | B2 * | 4/2021 | Kishikawa | .......... H04L 63/1416 |

(Continued)

FOREIGN PATENT DOCUMENTS

| JP | 2009-253557 A | 10/2009 |
| JP | 5222002 B2 | 6/2013 |

(Continued)

OTHER PUBLICATIONS

Olufowobi, Habeeb et al; "Anomaly Detection Approach Using Adaptive Cumulative Sum Algorithm for Controller Area Network"; Iowa State University Digital Repository; Mar. 2019 (Year: 2019).*

*Primary Examiner* — Jerry B Dennison
(74) *Attorney, Agent, or Firm* — Harness, Dickey & Pierce, P.L.C.

(57) ABSTRACT

In an anomaly detection by an electronic control unit connected to an other electronic control unit via a communication network, a data frame is received from the other electronic control unit, and a reception interval is calculated between a first data frame and a second data frame received immediately before the first data frame. A determination value for determining whether the data frame is anomalous is updated by adding a predetermined value to the determination value when the reception interval is equal to or less than a threshold value, and the data frame is determined to be anomalous when the determination value exceeds a limit value.

9 Claims, 8 Drawing Sheets

(56) References Cited

U.S. PATENT DOCUMENTS

| | | | |
|---|---|---|---|
| 10,999,248 B2* | 5/2021 | Kishikawa | H04L 12/40 |
| 11,025,846 B2* | 6/2021 | Kawazu | H04N 5/3698 |
| 2013/0339721 A1* | 12/2013 | Yasuda | H04L 67/12 |
| | | | 713/100 |
| 2014/0256278 A1 | 9/2014 | Ko et al. | |
| 2014/0328352 A1* | 11/2014 | Mabuchi | H04L 12/4035 |
| | | | 370/451 |
| 2018/0269961 A1* | 9/2018 | Tsuboi | H04B 1/3822 |
| 2018/0316680 A1* | 11/2018 | Kishikawa | B60R 16/0231 |
| 2019/0104204 A1* | 4/2019 | Kawakami | H04L 1/205 |
| 2020/0412753 A1* | 12/2020 | Akashi | H04L 63/1425 |
| 2021/0006479 A1* | 1/2021 | Sugashima | H04L 43/16 |
| 2021/0036971 A1* | 2/2021 | Sugashima | H04L 63/1425 |
| 2021/0044610 A1* | 2/2021 | Kishikawa | H04L 67/12 |
| 2021/0143810 A1* | 5/2021 | Takuma | H03K 17/082 |

FOREIGN PATENT DOCUMENTS

| | | |
|---|---|---|
| JP | 5664799 B2 | 2/2015 |
| JP | 2017-126989 A | 7/2017 |
| WO | WO-2013-094072 A1 | 6/2013 |

* cited by examiner

ELECTRONIC CONTROL UNIT, NON-TRANSITORY TANGIBLE COMPUTER READABLE MEDIUM, AND ANOMALY DETECTION METHOD

CROSS REFERENCE TO RELATED APPLICATION

The present application claims the benefit of priority from Japanese Patent Application No. 2019-124675 filed on Jul. 3, 2019. The entire disclosure of the above application is incorporated herein by reference.

TECHNICAL FIELD

The present disclosure relates to ECU (Electronic Control Unit), a non-transitory tangible computer readable medium, and an anomaly detection method.

BACKGROUND

Conventionally, an automobile is mounted with various types of electronic control units and these electronic control units are connected with one another via a communication network to constitute an in-vehicle system. NIDS (Network-based Intrusion Detection System) is known to be used to detect any external suspicious access or data in such an in-vehicle system.

For example, a conceivable communication system has a simple configuration capable of determining validity of a message communicated in the communication system. In this communication system, a plurality of ECUs are connected to a communication bus so as to allow messages to be communicated. In each ECU, a specified communication interval is set and when transmitting a message, the ECU transmits the message based on the specified communication interval. When a communication interval of a received message is shorter than the specified communication interval, the message is determined not to be normal.

A conceivable relay connection unit relays messages communicated between electronic control units. The relay connection unit counts a number of times of reception of messages received in a predetermined set time and, when a number of times of reception exceeds a set number of times, determines a message not to be normal.

SUMMARY

In an anomaly detection by an electronic control unit connected to an other electronic control unit via a communication network, a data frame is received from the other electronic control unit, and a reception interval is calculated between a first data frame and a second data frame received immediately before the first data frame.

A determination value for determining whether the data frame is anomalous is updated by adding a predetermined value to the determination value when the reception interval is equal to or less than a threshold value, and the data frame is determined to be anomalous when the determination value exceeds a limit value.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

A time indicated by a time stamp added to a received message can be utilized to calculate a communication interval of a message in a conceivable communication system. However, an actual time and a time indicated by an added time stamp may deviate from each other depending on a time resolution of the time stamp. For this reason, validity of a message can be erroneously determined because of such time deviation. According to the technique in a conceivable relay connection unit, a probability of erroneous determination due to time resolution of a time stamp is reduced. However, since the reception times of all the messages received within a set time must be temporarily stored, a memory consumption can be increased.

According to the above view, a memory consumption is suppressed, and further validity of a data frame with accuracy is determined.

According to an example embodiment, an electronic control unit includes: a reception unit that receives a data frame periodically transmitted from an other electronic control unit; a reception interval calculation unit that calculates a reception interval between a first data frame as the data frame received by the reception unit and a second data frame received by the reception unit immediately before the first data frame; a storage unit that holds a determination value for determining whether the data frame is anomalous; a determination value updating unit that, when the reception interval is equal to or less than a threshold value, updates the determination value by adding a predetermined value to the determination value; and an anomaly determination unit that determines the data frame to be anomalous when the determination value exceeds a limit value, According to an example embodiment, an anomaly detection program executed by an electronic control unit connected to an other electronic control unit via a communication network, the anomaly detection program comprising instructions, the instructions includes: receiving a data frame periodically transmitted from the other electronic control unit; calculating a reception interval between a first data frame as the data frame received and a second data frame received immediately before the first data frame; updating a determination value for determining whether the data frame is anomalous by adding a predetermined value to the determination value when the reception interval is equal to or less than a threshold value; and determining the data frame to be anomalous when the determination value exceeds a limit value.

According to an example embodiment, an anomaly detection method performed by an electronic control unit connected to an other electronic control unit via a communication network, the anomaly detection method includes: receiving a data frame periodically transmitted from the other electronic control unit; calculating a reception interval between a first data frame as the data frame received and a second data frame received immediately before the first data frame; updating a determination value for determining whether the data frame is anomalous by adding a predetermined value to the determination value when the reception interval is equal to or less than a threshold value; and determining the data frame to be anomalous when the determination value exceeds a limit value.

According to an electronic control unit, even when the accuracy of a time associated to a data frame is not high, a probability of erroneous determination of validity of a data frame can be reduced by using a determination value accumulated according to a reception interval of the data frame to determine validity of the data frame. Since a data frame can be determined without storing a reception time of a past data frame, a memory consumption can be suppressed.

Hereafter, a description will be given to embodiments of the present disclosure with reference to the drawings.

An effect described in an embodiment is an effect obtained when a configuration of an embodiment as an example of the present disclosure is provided and is not necessarily an effect brought about by the present disclosure.

When a plurality of embodiments are present, a configuration disclosed in each embodiment is not closed only in the embodiment and can be combined with another configuration astride embodiments. For example, a configuration disclosed in one embodiment may be combined with another embodiment. Configurations disclosed in the plurality of embodiments may be combined.

A problem described in Problems to be Solved by the Disclosure is not a publicly known problem but is originally found by the present inventors and is a fact that confirms non-obviousness of the present disclosure together with a configuration and a method of the present disclosure.

First Embodiment

Figure 1:
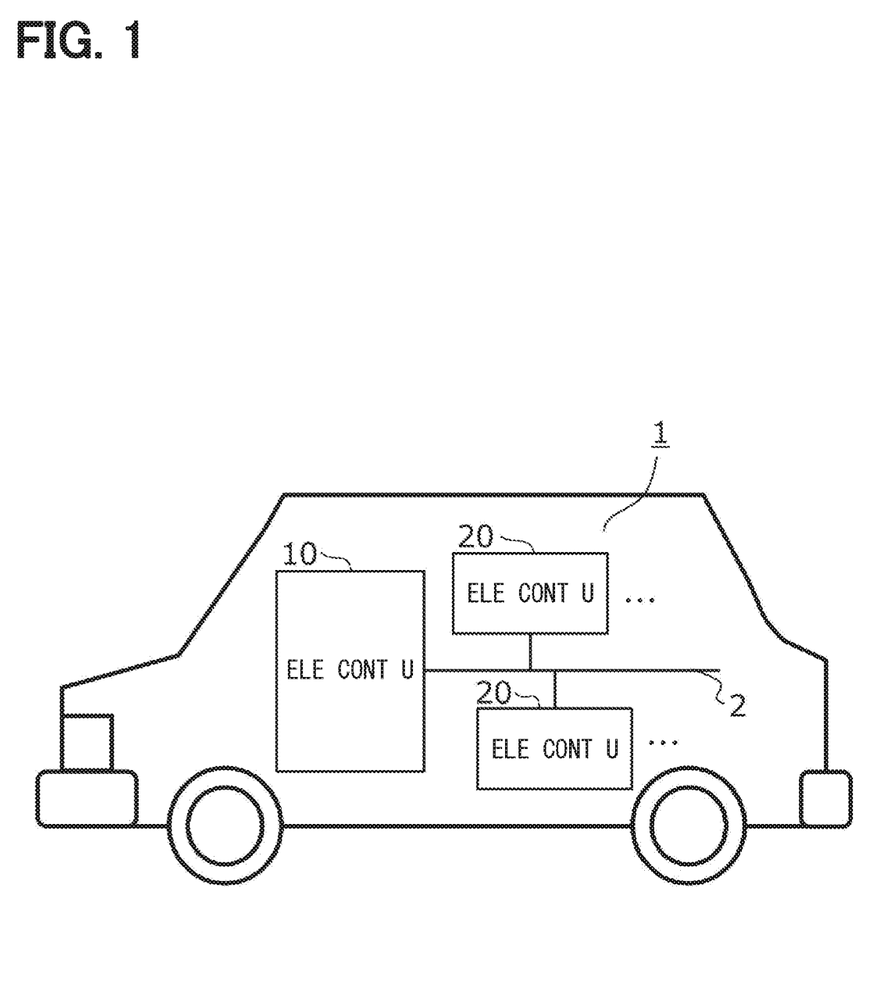
FIG. 1 is a drawing illustrating an in-vehicle system including an electronic control unit in first to third embodiments.

FIG. 1 illustrates an in-vehicle system 1 including an electronic control unit 10, a plurality of electronic control units 20, and a communication network 2 connecting these electronic control units with one another. In a description of the following embodiment, the electronic control unit 10 configured as a gateway receives data frames transmitted from the electronic control units 20 and performs a series of anomaly detection processing described later. However, the electronic control unit 10 in this embodiment is not limited to an electronic control unit as a gateway. For example, the electronic control unit 10 in this embodiment may be provided in the in-vehicle system 1 as an electronic control unit dedicated to anomaly detection.

For the communication network 2, aside from such a communication system as CAN (Controller Area Network) and LIN (Local Interconnect Network), for example, any communication system, such as Ethernet (registered trademark), Wi-Fi (registered trademark), and Bluetooth (registered trademark), may be used. In the following description, a case where CAN is used will be taken as an example.

The electronic control units 20 periodically transmits a data frame to the electronic control unit 10. In the following description, an electronic control unit 20 that transmits a data frame to the electronic control unit 10 will be designated as a sending electronic control unit (corresponding to "other electronic control units" of the present disclosure). Data frames periodically transmitted by the sending electronic control unit 20 includes varied data detected by a sensor or the like mounted in a vehicle, a control value controlling the vehicle, and the like.

Figure 2:
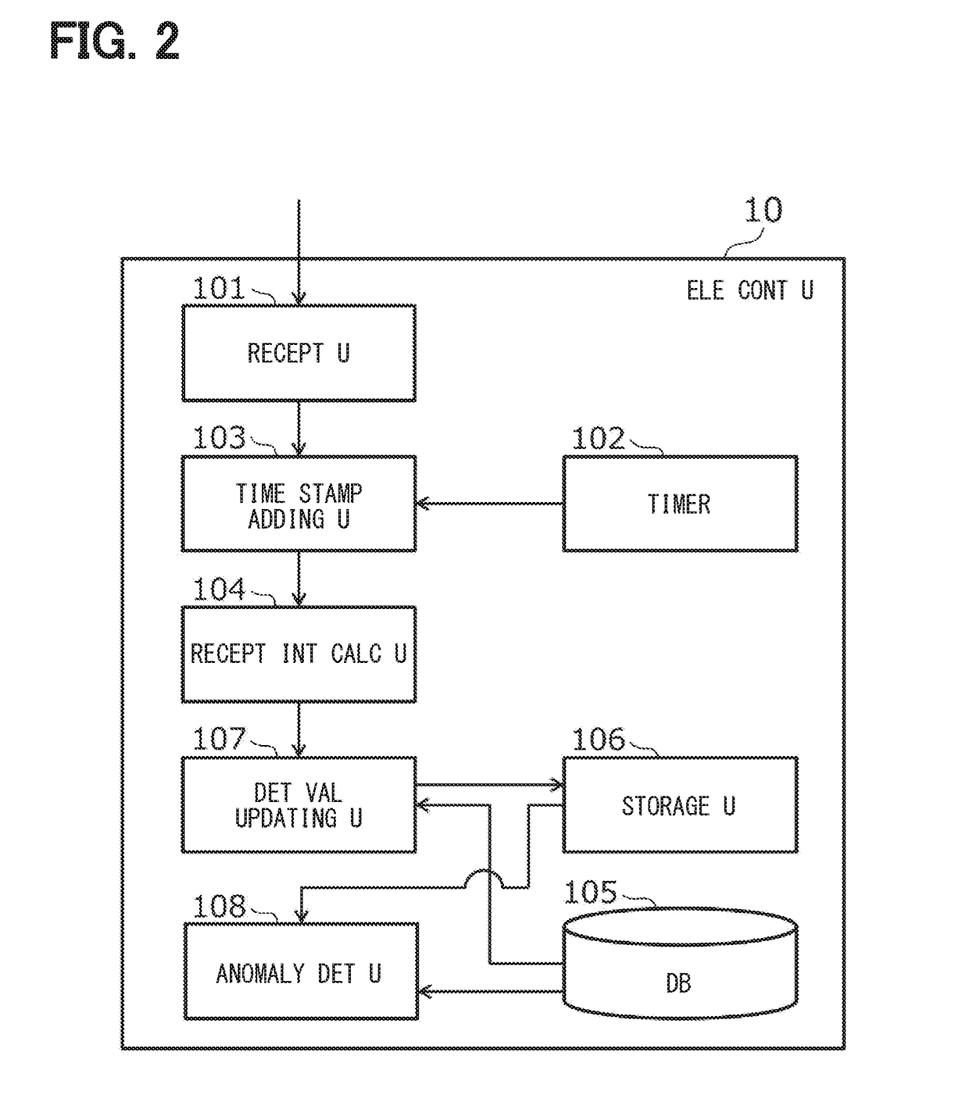
FIG. 2 is a block diagram of an electronic control unit in the first to third embodiments.

FIG. 2 illustrates a configuration of the electronic control unit 10. The electronic control unit 10 includes a reception unit 101, a timer 102, a time stamp adding unit 103, a reception interval calculation unit 104, a database 105, a storage unit 106, a determination value updating unit 107, and an anomaly determination unit 108.

The reception unit 101 receives data frames periodically transmitted from the sending electronic control unit 20 via CAN.

The timer 102 is a clock of the electronic control unit 10. The timer 102 is arbitrarily configured and may be comprised of, for example, a free-run counter that counts internal clock at the same time as start of the electronic control unit 10 or a frequency dividing counter that divides and counts an internal clock frequency or may be a timer that references to an absolute time acquired by GPS.

The time stamp adding unit 103 adds a time stamp indicating a time when the reception unit 101 received a data frame to the data frame based on a time on the timer 102. The time stamp adding unit 103 samples data frames received by the reception unit 101 in a predetermined cycle and adds a time stamp. For this reason, strictly a time stamp time added to a data frame and a time when the reception unit 101 actually receives the data frame may differ from each other.

Figure 3:
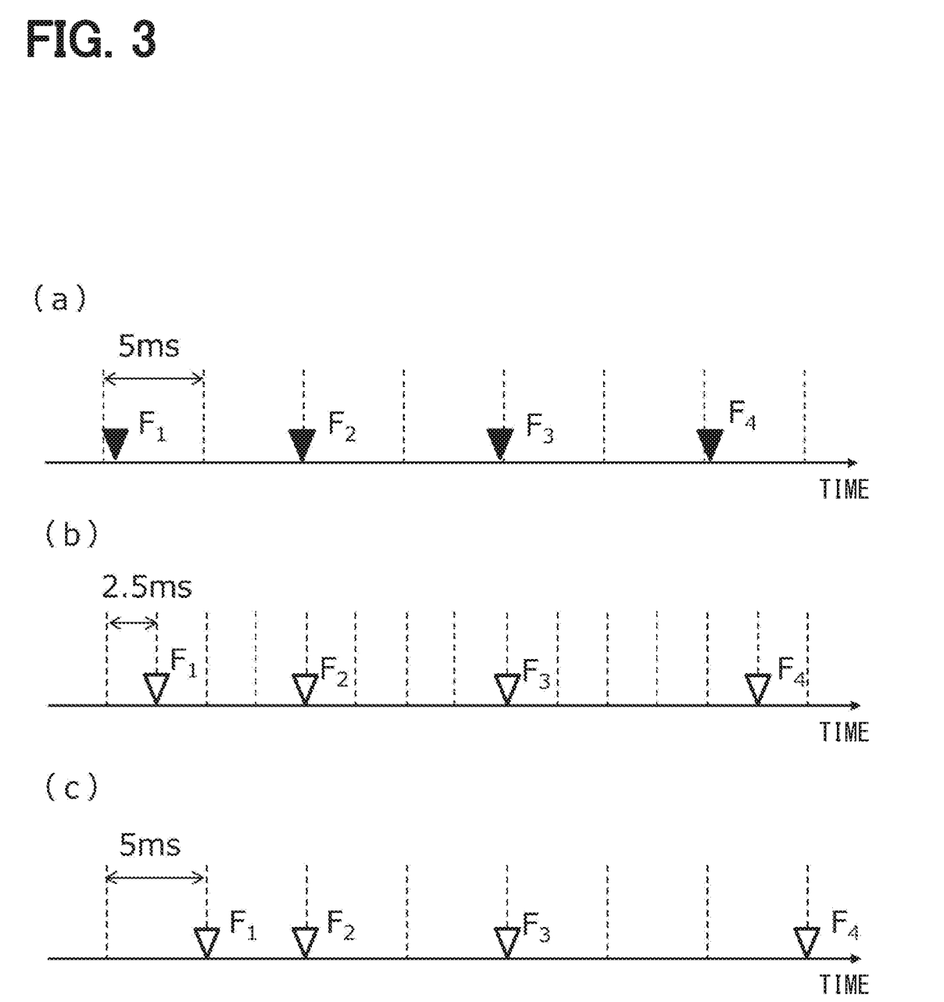
FIG. 3 is a drawing illustrating a time stamp added by a time stamp adding unit in the first to third embodiments.

A description will be given to time stamps added by the time stamp adding unit 103 with reference to (a) to (c) in FIG. 3. (a) in FIG. 3 shows data frames $F_1$ to $F_4$ at times when the reception unit 101 actually receives the data frames. In this example, the reception unit 101 receives data frames at a reception interval of approximately 10 ms, (b) in FIG. 3 and (c) in FIG. 3 respectively show data frames $F_1$ to $F_4$ at times of time stamps added when each data frame in (a) in FIG. 3 is sampled at internals of 2.5 ms and 5 ms. As apparent from comparison of (a) in FIG. 3 with (b) in FIG. 3 and (c) in FIG. 3, a deviation is produced between an actual reception time of each data frame and a time added to the data frame and this deviation becomes more pronounced as a sampling interval becomes longer. For example, though the reception interval of data frames $F_1$ and $F_2$ is actually approximately 10 ms, a reception interval based on a time stamp time shown in FIG. 3B is 7.5 ms and a reception interval based on a time stamp time shown in (c) in FIG. 3 is 5 ms. For this reason, when whether a data frame is anomalous is determined based only on a reception interval, data frame $F_2$ is probably determined to be anomalous.

The reception interval calculation unit 104 calculates a reception interval between a data frame (corresponding to "first data frame") received by the reception unit 101 and a data frame (corresponding to "second data frame") received by the reception unit immediately before the relevant data frame based on times of time stamps added to the data frames.

As mentioned above, an electronic control unit 20 periodically transmits data frames. For this reason, a reception interval of data frames received at the reception unit 101 of the electronic control unit 10 is, as a rule, equal to a transmission interval of the electronic control unit 20. However, when an invalid data frame transmitted by unauthorized access is received, a reception interval of the data frames is shorter than a transmission interval. As shown in (a) to (c) in FIG. 3, a reception interval of data frames is made shorter than a transmission interval also by a deviation being produced between a time stamp time and an actual reception time.

The database 105 holds a threshold value of a reception interval of data frames received by the reception unit 101. A threshold value of a reception interval is desirably equal to or below a minimum value assumed as a reception interval of normal data frames and is set to, for examples; a value equal to 90% or 80% of a predetermined transmission interval at which a sending electronic control unit 20 transmits data frames. The database 105 further holds a limit value used as a basis on which the anomaly determination unit 108 described later determines whether a data frame is anomalous or not. When the reception unit 101 receives a plurality of types of data frames having different CAN-IDs, a threshold value and a limit value of a reception interval for each CAN-ID is stored in the database 105. A threshold value in this embodiment is set in accordance with a transmission cycle in which the sending electronic control unit 20 transmits data frames. A limit value is desirably set in accordance with a sampling cycle of the time stamp adding unit 103.

A threshold value and a limit value in this embodiment are fixed values and are assumed to be stored in the database 105 at, for example, a manufacturing plant of the electronic control unit or a dealer who sells a vehicle equipped with the in-vehicle system 1. However, a threshold value and a limit value may be variable values that dynamically vary according to various parameters. For example, when the communication network 2 is congested, data frames are probably received with delay. Consequently, when the communication network 2 is highly loaded, a threshold value and a limit value of a reception interval may be automatically set to higher values than ordinary values.

The storage unit 106 holds a determination value used to determine whether a data frame is anomalous or not. A determination value stored in the storage unit 106 is updated by the determination value updating unit 107 described later as appropriate. The storage unit 106 is assumed to be random access memory and determination value data is erased when the power to the electronic control unit 10 is turned OFF. When the power is turned ON again in this case, a determination value is reset to a preset initial value. The storage unit 106 may be HDD (Hard Disk), flash memory, or the like.

The determination value updating unit 107 compares a reception interval calculated by the reception interval calculation unit 104 with a threshold value stored in the database 105. The determination value stored in the storage unit 106 is updated according to a result of the comparison. Specifically, when a reception interval is "equal to or less than" a threshold value, the determination value updating unit 107 "adds" a "predetermined" value to a determination value to update the determination value. The updated determination value is overwritten and stored in the storage unit 106.

Cases where a value "equal to or less than" a comparative value is cited in the present disclosure include both cases where a value equal to the comparative value is included and cases where a value equal to the comparative value is not included.

Cases where a "predetermined" value is cited in the present disclosure include cases where the value is always constant as well as cases where the value is uniquely determined according to a condition.

"Add" cited in the present disclosure includes a calculation of adding a negative value as well as a calculation of adding a positive value.

The determination value updating unit 107 further resets and updates a determination value to an initial value when the anomaly determination unit 108 described later determines that a data frame is anomalous.

The anomaly determination unit 108 compares a determination value updated by the determination value updating unit 107 and a limit value stored in the database 105 with each other. The anomaly determination unit determines that a data frame received at the reception unit 101 is anomalous when a result of the comparison reveals that the determination value is beyond the limit value. When the anomaly determination unit 108 makes a determination of anomaly, a log indicating detection of the anomaly is recorded. Instead of recording a log, a data frame determined to be anomalous may be discarded.

Cases where a value "beyond" a limit value is cited here also include cases where the relevant value is equal to the limit value. Cases where a value "beyond" a limit value is cited here include cases where the relevant value is lower than the limit value as well as cases where the relevant value is higher than the limit value.

The anomaly determination unit 108 may determine a data frame received at the reception unit 101 immediately before a determination value exceeds a limit value to be anomalous. However, like data frame $F_2$ shown in (b) in FIG. 3 and (c) in FIG. 3, a reception interval calculated based on a time stamp time can be shorter than an actual reception interval depending on a sampling cycle of the time stamp adding unit 103. For this reason, a data frame received immediately before a determination value exceeds a limit value is not necessarily an anomalous data frame.

Consequently, the anomaly determination unit 108 may determine any of a data frame received immediately before a determination value exceeds a limit value or a predetermined number of data frames received immediately before the relevant data frame to be anomalous. Alternatively, the anomaly determination unit 108 determines any of data frames received within a predetermined time preceding a time when a determination value got beyond a limit value to be anomalous.

In another example, all the data frames received until a determination value exceeds a limit value after the determination value was reset to an initial value may be determined to be anomalous. In this case, however, the determination value updating unit 107 is desirably configured to periodically reset a determination value to an initial value.

A determination value used to determine whether a data frame is anomalous or not is, for example, a total value of a "difference" between a reception interval of data frames and a threshold value of a reception interval. That is, when a reception interval is equal to or less than a threshold value, the determination value updating unit 107 adds, as a predetermined value, a difference between a reception interval of data frames and a threshold value to a determination value stored in the storage unit 106 to update the determination value.

"Difference" cited in the present disclosure only has to include a subtraction and includes not only simple difference (y−x) but also square difference ($y^2-x^2$), square root of a difference $((y-x)^{1/2})$, weighted difference (by−ax: a and b are constants), and like.

A determination value need not be a total value of a difference itself between a reception interval and a threshold value and may be a total value of numerical values associated with a magnitude of a difference. For examples, differences between a reception interval of data frames and a threshold value are classified into a plurality of ranges and ranges of differences between a reception interval and a threshold value and numerical values corresponding to each range are stored in the database 105 as a table. When a difference between a reception interval and a threshold value is within a specific difference range, a numerical value corresponding to that range is added to a determination value.

In another example, a determination value is a value indicating a total number of times when a reception interval of data frames becomes equal to or less than a threshold value. For example, when a reception interval is equal to or less than a threshold value, the determination value updating unit 107 adds "1" as a predetermined value to a determination value stored in the storage unit 106 to update the determination value. A predetermined value added to a determination value need not be "1" and may be set to any other numerical value.

Figure 4:
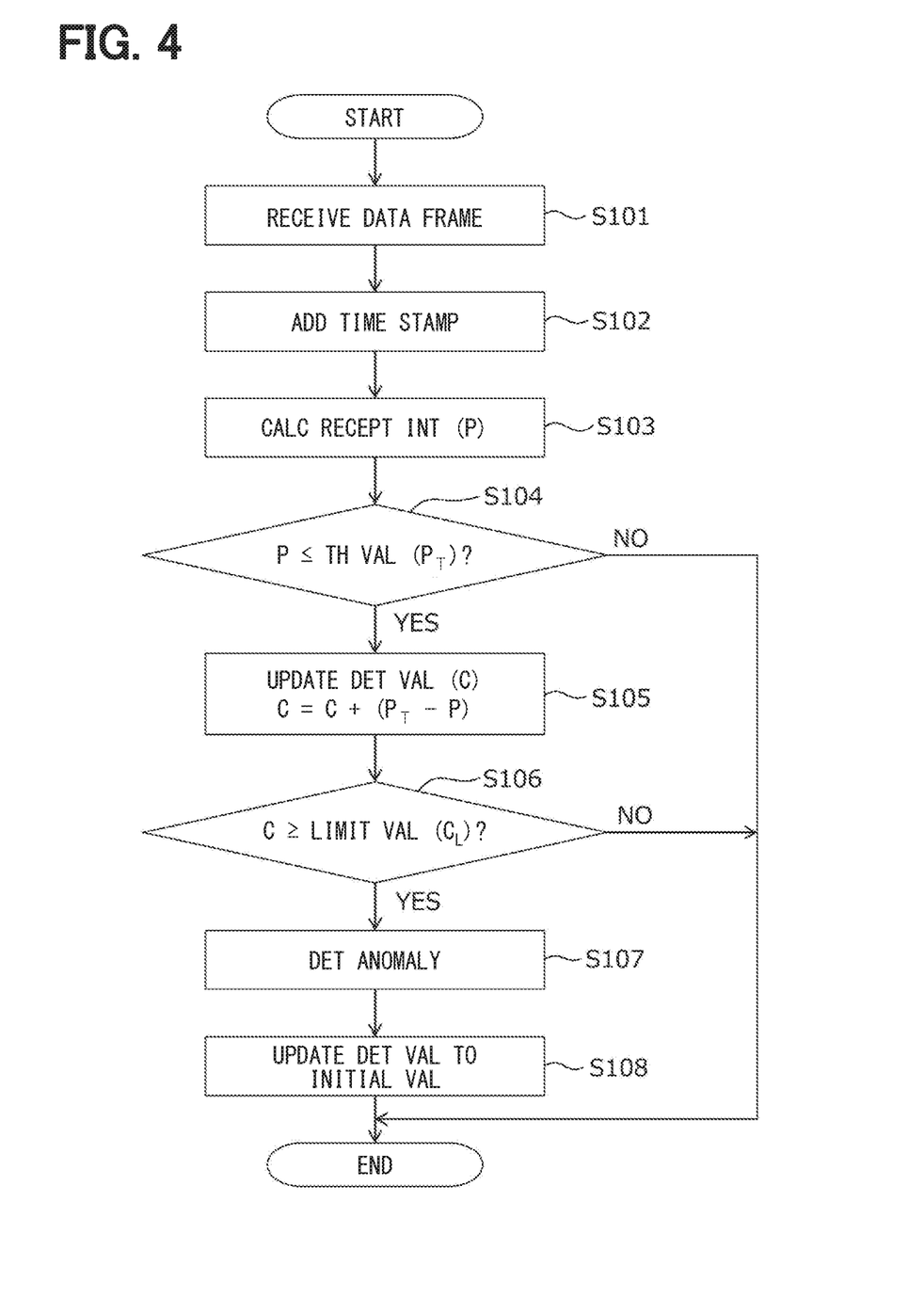
FIG. 4 is a drawing illustrating an operation of an electronic control unit in the first embodiment.
Figure 6:
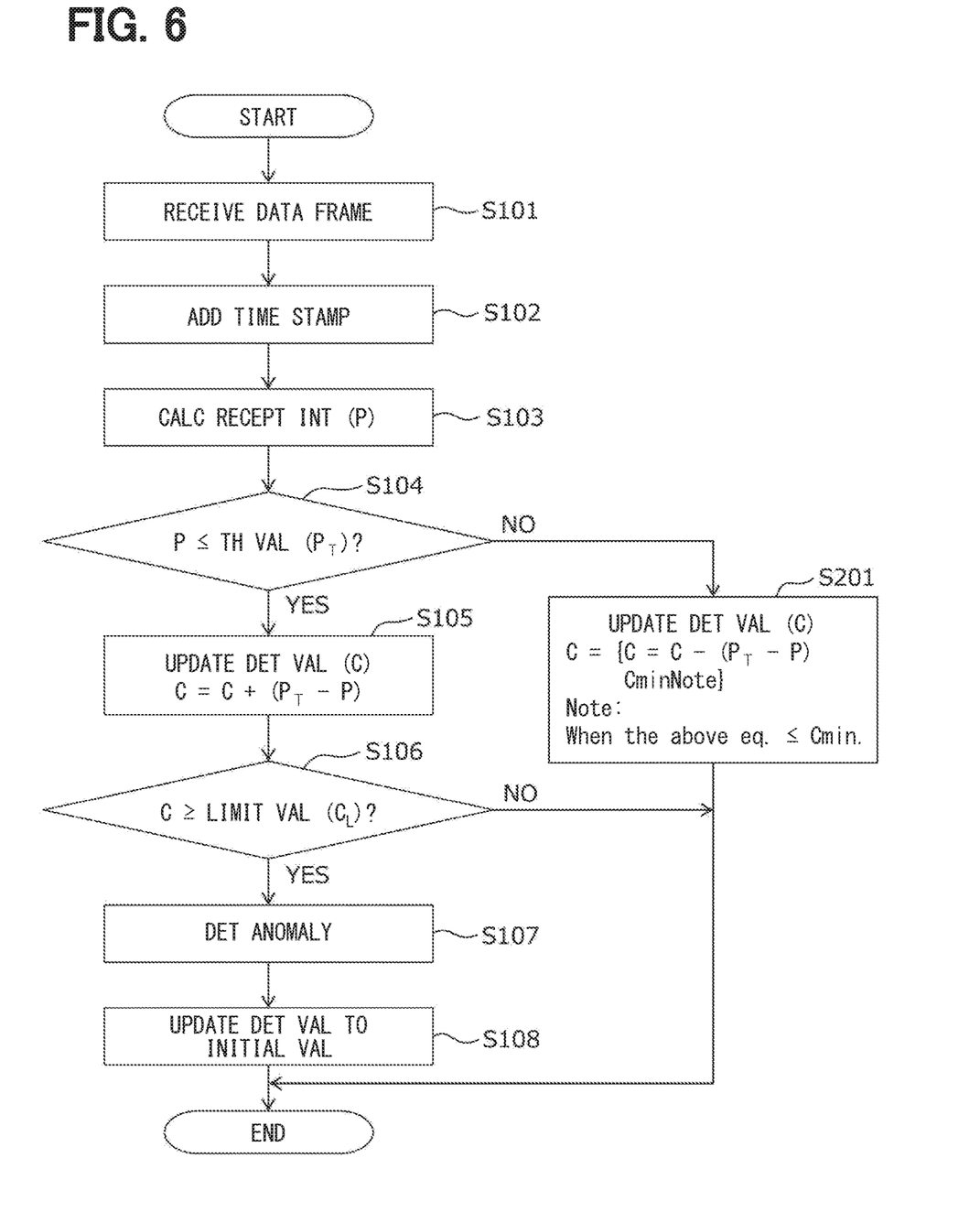
FIG. 6 is a drawing illustrating an operation of an electronic control unit in the second embodiment.

A description will be given to operation of the electronic control unit 10 with reference to FIG. 4. FIG. 4 and FIG. 6 referenced to later show not only a method for detecting any anomaly in a data frame at the electronic control unit 10 but also a processing procedure for a program executed at the electronic control unit 10. The processing shown in FIG. 4 and FIG. 6 is repeatedly performed each time the electronic control unit 10 receives a data frame.

At S101, a data frame periodically transmitted from sending electronic control units 20 is received.

At S102, a time stamp is added to the received data frame.

At S103, a reception interval (P) between the data frame received at S101 and a data frame received immediately before that data frame is calculated based on a time indicated by the time stamp added at S102.

At S104, the reception interval (P) calculated at S103 and a threshold value ($P_T$) of a reception interval are compared with each other. When the reception interval is equal to or less than the threshold value (S104: YES), the processing proceeds to the operation of S105. When the reception interval is more than the threshold value (S104: NO), the processing is terminated.

At S105, a predetermined value, a difference ($P_T-P$) between a reception interval and a threshold value in the example shown in FIG. 4, is added to a determination value (C) stored in the storage unit 106 to update the determination value.

At S106, the updated determination value (C) and a preset limit value (CO are compared with each other. When the determination value is beyond the limit value (S106: YES), the relevant data frame is determined to be anomalous at S107. When the determination value is not beyond the limit value (S106: NO), the processing is terminated.

At S108, the determination value is reset and updated to an initial value.

Figure 5:
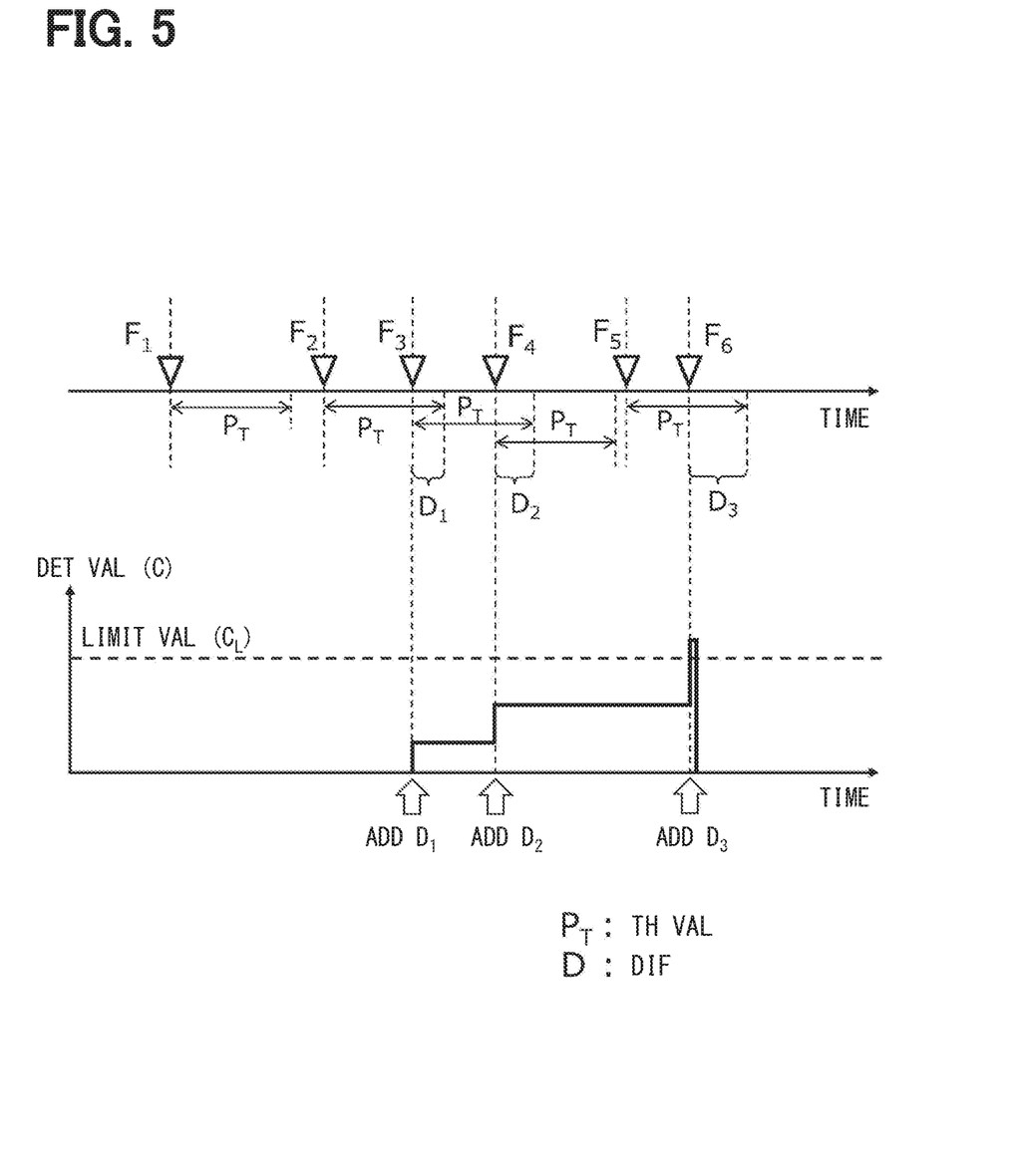
FIG. 5 is a drawing illustrating a determination value updated by a determination value updating unit in the first embodiment.

FIG. 5 illustrates change of a determination value updated by the determination value updating unit 107. The upper tier of FIG. 5 indicates times of time stamps added to data frames $F_1$ to $F_6$ and the lower tier indicates a determination value varied according to reception intervals of data frames $F_1$ to $F_6$. A determination value at time when data frame $F_1$ is received is an initial value and is 0 in this example.

As shown in FIG. 5, a reception interval between data frames $F_1$ and $F_2$ is equal to or more than the threshold value $P_T$; therefore, a predetermined value is not added to the determination value, which is unchanged. Meanwhile, a reception interval between data frames $F_2$ and $F_3$ is equal to or less than the threshold value $P_T$; therefore, a difference $D_1$ between the reception interval between data frames $F_2$ and $F_3$ and the threshold value $P_T$ is added to the determination value. Similarly, a difference $D_2$ between a reception interval between data frames $F_3$ and $F_4$ and the threshold value $P_T$ and a difference $D_3$ between a reception interval between data frames $F_5$ and $F_6$ and the threshold value $P_T$ are added to the determination value. When as the result of adding the difference $D_3$, the determination value exceeds the limit value, the anomaly determination unit 108 determines that any of data frame $F_6$ and a predetermined number, for example, four of data frames $F_2$, $F_3$, $F_4$, and $F_5$ received immediately before data frame $F_6$ to be anomalous. Then the anomaly determination unit updates the determination value to the initial value of 0.

Here, (c) in FIG. 3 will be referenced to again. As mentioned above, a deviation can be produced between an actual reception time of a data block and a time stamp time because of a sampling cycle of the time stamp adding unit 103 and the reception interval based on time stamp time can be shorter than the actual reception interval. However, when the reception unit 101 periodically receives data frames as shown in (a) to (c) in FIG. 3, a phenomenon that a reception interval based on a time stamp time is shorter than an actual reception interval less probably successively occurs. For this reason, even when a difference between a reception interval between data frames $F_1$ and $F_2$ and a threshold value is added to a determination value, the determination value less probably exceeds an upper limit value. Therefore, a possibility that a normal data frame is erroneously determined to be an anomalous data frame because of a deviation between an actual reception time and a time stamp time is reduced.

In the description of the above embodiment, a case where when a reception interval of data frames is equal to or less than a threshold value, a positive value as a predetermined value is added to an initial value is taken as an example. However, a predetermined value need not be a positive value and may be a negative value. In this case, when a reception interval of data frames is equal to or less than a threshold value, a determination value is reduced by adding a predetermined value to the determination value. When a determination value exceeds a limit value, that is, when a determination value falls below a limit value, the anomaly determination unit 108 determines a data frame to be anomalous. For example, a value (for example, 100) other than 0 is set as an initial value of a determination value and when a determination value falls below 0, an anomaly is determined.

According to this embodiment, when a communication interval becomes equal to or less than a threshold value, a determination value is added and a data frame is determined based on the total determination value. As a result, a possibility that a normal data frame is erroneously determined to be an anomalous data frame can be reduced.

According to this embodiment, further, a data frame can be determined with accuracy without storing the reception times of a plurality of data frames received in the past; therefore; a memory consumption can be suppressed.

Second Embodiment

In the above description of the first embodiment, a configuration in which when a reception interval of data frames is equal to or less than a threshold value, a predetermined value is added to a determination value and a data frame is determined based on the total determination value as the result of addition is taken as an example. However, with the configuration of the first embodiment, as the result of determination values being accumulated for a long time, a determination value exceeds a limit value and a normal data frame can be erroneously determined to be anomalous. Consequently, in relation to this embodiment, a configuration in which determination values are prevented from being accumulated for a long time and data frames are determined with accuracy will be described.

The configuration of an electronic control unit 10 in this embodiment is the same as that in the first embodiment and a description will be given mainly to a difference from the first embodiment with reference to FIG. 2.

As in the first embodiment, the determination value updating unit 107 compares a reception interval calculated by the reception interval calculation unit 104 and a threshold value stored in the database 105 with each other. When the reception interval is equal to or less than the threshold value; the determination value updating unit adds a predetermined value to a determination value to update the determination value. When the reception interval is "equal to or more than" the threshold value, the determination value updating unit subtracts a predetermined value from a determination value. For a determination value in this embodiment; a minimum value is desirably preset. In this case, a value equal to or less than the minimum value is not obtained even when a predetermined value is subtracted from a determination value.

Cases where a value "equal to or more than" a comparative value is cited in the present disclosure include both cases where a value equal to the comparative value is included and cases where a value equal to the comparative value is not included.

"Subtract" cited in the present disclosure includes a calculation of subtracting a negative value as well as a calculation of subtracting a positive value.

As in the first embodiment, the determination value updating unit 107 further resets and updates a determination value to an initial value when the determination value exceeds a limit value.

This embodiment may be so configured that a predetermined value is added when a reception interval is equal to a threshold value or so configured that a predetermined value is subtracted. That is, when a configuration that a predetermined value is subtracted when a reception interval is equal to a threshold value is adopted, a predetermined value is added to a determination value when the reception interval is less than a threshold value, not when the reception interval is equal to or less than a threshold value. Alternatively, when a reception interval is equal to a threshold value, it can be accepted that any value is not added to or is not subtracted from a determination value and the determination value is not updated.

As in the first embodiment, a determination value used to determine whether a data frame is anomalous or not is, for example, a difference between a reception interval and a threshold value of a reception interval, a numerical value set according to the magnitude of a difference, or a value calculated based on a number of times when a number of times of reception of a data frame becomes equal to or less than a threshold value and equal to or more than a threshold value.

A description will be given to operation of the electronic control unit 10 in this embodiment with reference to FIG. 6.

The same operation as in FIG. 4 will be marked with the same reference numeral and a description of such operation will be omitted. In FIG. 6, operation of S201 is added to the flowchart in FIG. 4.

In this embodiment, when a communication interval (P) is more than a threshold value ($P_T$) at S104 (S104: NO), that is, when a communication interval is equal to or more than a threshold value, the processing proceeds to S201.

At S201, a predetermined value, a difference ($P-P_T$) between a reception interval and a threshold value in the example shown in FIG. 6, is subtracted from a determination value (C) stored in the storage unit 106 to update the determination value. When a value obtained by subtracting a difference ($P-P_T$) between a reception interval and a threshold value from a determination value is equal to or less than a minimum value ($C_{min}$), the determination value is updated to the minimum value.

Figure 7:
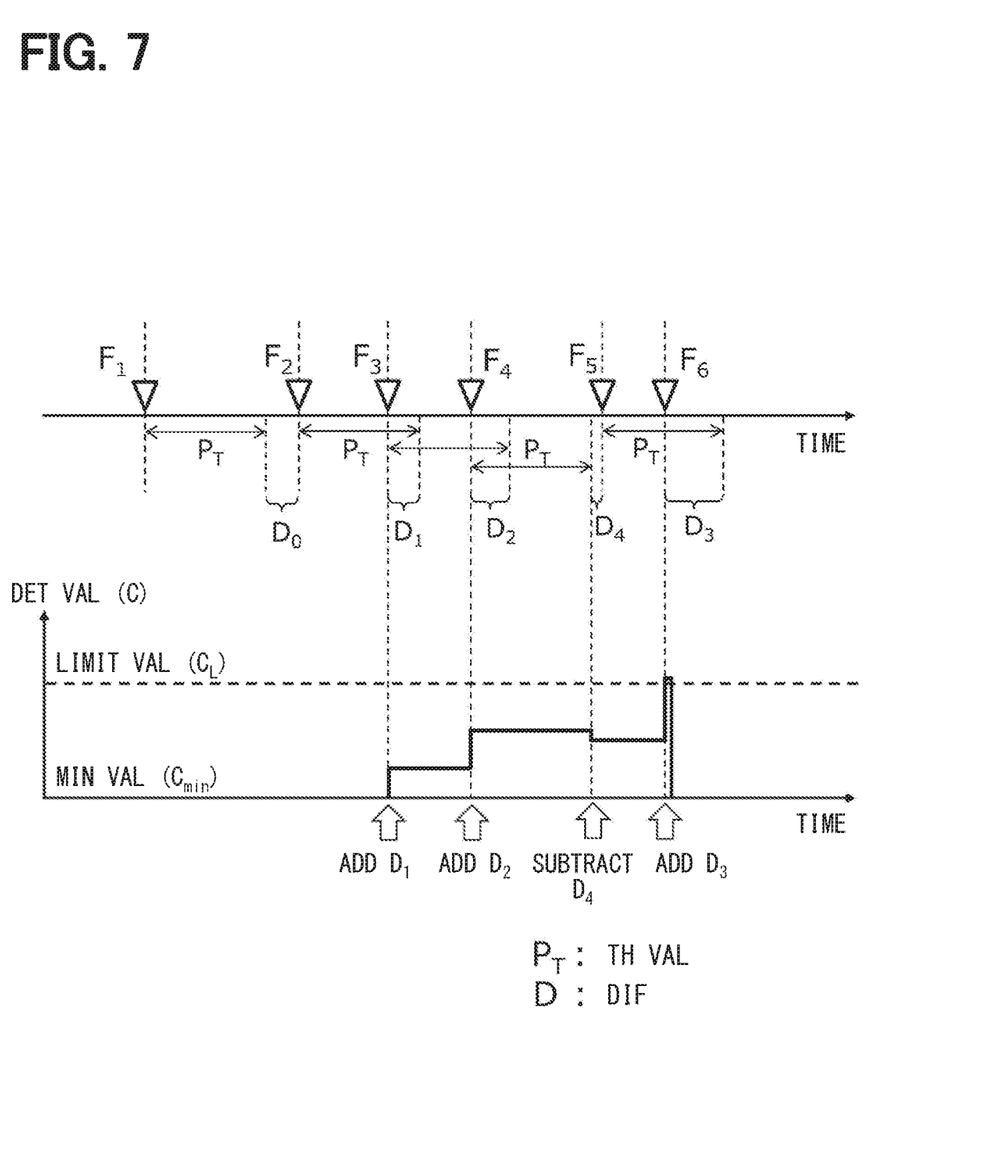
FIG. 7 is a drawing illustrating a determination value updated by a determination value updating unit in the second embodiment.

FIG. 7 illustrates change of a determination value updated by the determination value updating unit 107 in this embodiment. The upper tier of FIG. 7 indicates times of time stamps added to data frames $F_1$ to $F_6$ and is the same as in FIG. 5. The lower tier of FIG. 7 indicates a determination value varied according to reception intervals of data frames $F_1$ to $F_6$.

As shown in FIG. 7, a reception interval between data frames $F_4$ and $F_5$ is equal to or more than a threshold value $P_T$. Consequently, a difference $D_4$ between the reception interval between data frames $F_4$ and $F_5$ and the threshold value $P_T$ is subtracted from a determination value. A reception interval between data frames $F_1$ and $F_2$ is also equal to or more than the threshold value $P_T$. However, a determination value at time when data frame $F_2$ is received is equal to a preset minimum value. For this reason, a difference $D_0$ between a reception interval between data frames $F_1$ and $F_2$ and the threshold value $P_T$ is not subtracted from a determination value. In FIG. 7, an initial value and a minimum value are set to an identical value but these values may be set to different values.

When a data frame received by the reception unit 101 does not include an invalid data frame and normal data frames are periodically received, after occurrence of a phenomenon that a reception interval based on a time stamp time is shorter than an actual reception interval, a phenomenon that a reception interval based on a time stamp time is longer than an actual reception interval can probably occur as well. In the example shown in (c) FIG. 3, a reception interval between data frames $F_1$ and $F_2$ based on a time stamp time is shorter than an actual reception interval but a reception interval between data frames $F_3$ and $F_4$ based on a time stamp time is longer than an actual reception interval.

Consequently, when a reception interval based on a time stamp time is equal to or more than a threshold value, a predetermined value is added to a determination value and further, when a reception interval based on a time stamp time is equal to or less than a threshold value, a predetermined value is subtracted from a determination value. As a result, a deviation between a time stamp time and an actual reception time can be averaged and a determination value can be prevented from being accumulated for a long time and getting beyond a limit value.

In this embodiment, when data frames whose reception interval is equal to or less than a threshold value are successively received, as in the first embodiment, a predetermined value is added to a determination value and the determination value will exceed a limit value. As a result, the anomaly determination unit 108 can determine a data frame to be anomalous.

In the description with reference to FIG. 7, a case where a difference between a reception interval and a threshold value is subtracted as a predetermined value from a determination value is taken as an example. However, a predetermined value is not limited to this example. When a communication interval is equal to or more than a threshold value, for example, "1" or another value may be subtracted as a predetermined value to update a determination value. As in the first embodiment, a predetermined value set according to the magnitude of a difference between a reception interval and a threshold value may be subtracted. As in the first embodiment, a predetermined value subtracted from a determination value need not be a positive value and may be a negative value.

As described up to this point, according to this embodiment, when a reception interval of data frames is equal to or more than a threshold value, a determination value can be prevented from being accumulated for a long time and getting beyond a limit value by subtracting a predetermined value from the determination value. Therefore, accuracy of data frame anomaly determination can be enhanced.

Third Embodiment

In the description of the first and second embodiments, cases where when a determination value exceeds a limit value, the determination value is reset and updated to an initial value is taken as an example. With respect to this embodiment, a description will be given to a configuration in which even when a determination value exceeds a limit value, the determination value is not reset and the processing is continued with reference to FIG. 2.

The determination value updating unit 107 in this embodiment operates like the determination value updating unit 107 in the second embodiment. When a reception interval calculated by the reception interval calculation unit 104 is equal to or less than a threshold value, the determination value updating unit adds a predetermined value to a determination value to update the determination value. When a reception interval is equal to or more than a threshold value, the determination value updating unit subtracts a predetermined value from a determination value. Unlike those in the first and second embodiments, however, the determination value updating unit 107 in this embodiment does not reset or update a determination value to an initial value even when the anomaly determination unit 108 determines a data frame to be anomalous.

The database 105 holds two limit values, first limit value and second limit value. The first limit value provides a basis for determining whether a data frame is anomalous or not, like the limit values described in relation to the first and second embodiments. Specifically, when a determination value exceeds a first limit value, the anomaly determination unit 108 determines a data frame to be anomalous. Meanwhile, the second limit value is a value on which determination of whether a data frame is normal or not is based. Specifically, when a determination value exceeds a first limit value and then exceeds a second limit value, the anomaly determination unit 108 that a data frame transitioned from an anomalous state to a normal state.

Figure 8:
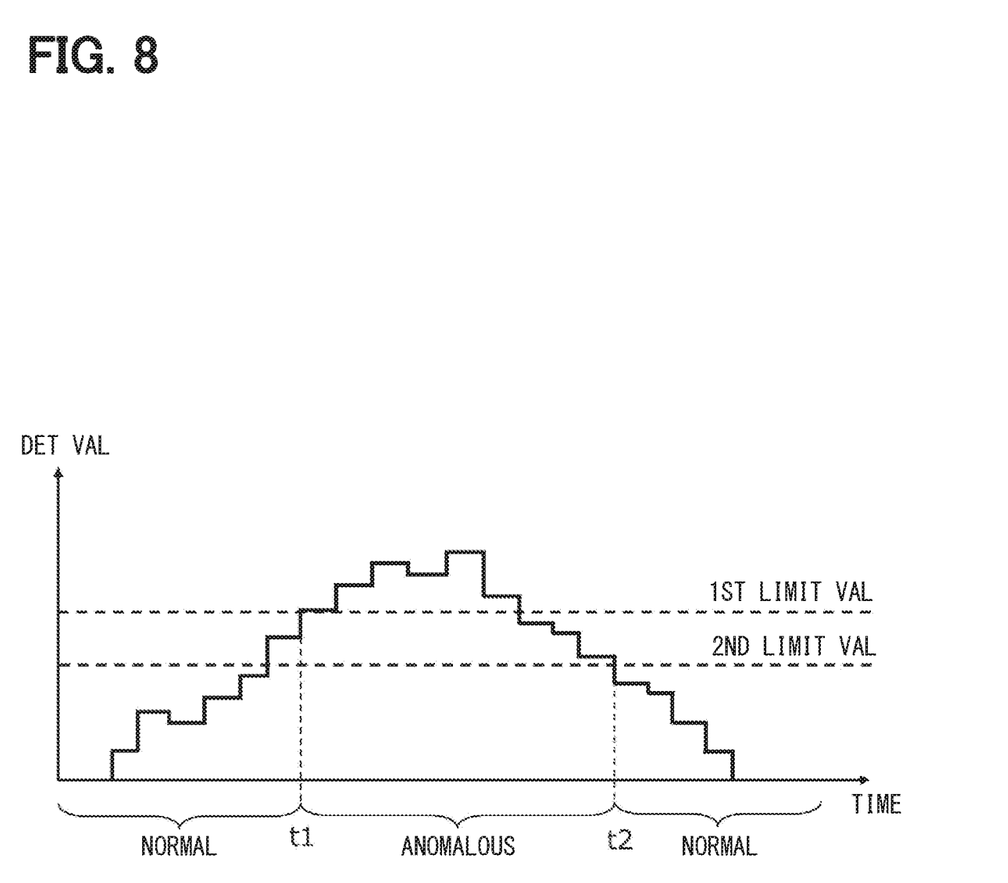
FIG. 8 is a drawing illustrating a determination value updated by a determination value updating unit in the third embodiment.

FIG. 8 illustrates change of a determination value updated by the determination value updating unit 107 in this embodiment. In the example shown in FIG. 8, a determination value exceeds a first limit value at time t1 and the determination value exceeds a second limit value at time t2. In this example, the anomaly determination unit 108 determines that data frames received before a determination value exceeds the first limit value, that is, before time t1 to be normal. Further, the anomaly determination unit 108 determines that data frames received before a determination value exceeds the second limit value after the determination value exceeds the first limit value, that is, during a period from time t1 to time t2 to be anomalous. Further, the anomaly determination unit 108 determines that data frames received after the determination value got beyond the second limit value, that is, after time t2 to be normal.

A consideration will be given to a case where even after a determination value exceeds a limit value, the reception unit 101 still successively receives data frames whose reception interval is equal to or less than a threshold value. In the first and second embodiments; when a determination value exceeds a limit value, the determination value is reset; therefore, the anomaly determination unit 108 cannot determine a data frame to be anomalous until the determination value is accumulated and exceeds the limit value again. However, when invalid data frames are successively transmitted as in a DoS attack, data frames whose reception interval is equal to or less than a threshold value, received immediately after a determination value exceeds a limit value can be probably anomalous. For this reason, these data frames are also desirably determined to be anomalous. In this embodiment, consequently, even after a determination value exceeds a limit value, the determination value is not reset and processing of adding or subtracting a predetermined value to or from the determination value is continuously performed. Thus, data frames after a determination value exceeds a limit value are also determined to be anomalous.

By setting a first limit value and a second limit value to different values, as shown in FIG. 8, a hysteresis can be provided and a result of determination by the anomaly determination unit 108 can be prevented from frequently transitioning between normal and anomalous. Specifically, the following advantage can be brought about by setting a first limit value and a second limit value to different values: after a determination value got beyond a limit value and an anomaly was determined; an anomalous state can be determined to have been completely eliminated only when normal data frames are successively received, that is, only when normal communication continues. As a result, a vehicle can be controlled based on data frames received after an anomalous state was completely eliminated.

In FIG. 8, the first limit value is set to a value higher than the second limit value but a first limit value may be a value lower than a second limit value. Further, a first limit value and a second limit value may be set to an equal value.

In this embodiment, aside from a first limit value and a second limit value, a maximum value of a determination value may be set. With a maximum value of a determination value set, the determination value is not added beyond the maximum value.

According to this embodiment, even after a determination value exceeds a limit value, anomality of data frames received after the determination value exceeds the limit value can also be determined by continuously performing adding and subtracting processing without resetting the determination value.

SUMMARY

Up to this point, a description has been given to features of an electronic control unit in each embodiment.

Terms used in the description of each embodiment are examples and may be replaced with synonymous terms or terms having a synonymous function.

The block diagram used to describe each embodiment is generated by classifying and organizing the configuration of an electronic control unit by function. These functional blocks are implemented by arbitrarily combining hardware or software. Since the block diagram shows functions, the block diagram can be grasped as a disclosure of an disclosure of process.

Order of functional blocks that can be grasped as processing, a flow, and a method described in relation to each embodiment may be changed unless some restriction is imposed, for example, a result from one step is utilized at another step.

The terms of "first" and "second" used in the description of each embodiment and the present disclosure are for discriminating two or more configurations and methods of the same kind and do not limit order or superiority or inferiority.

Examples of an electronic control unit as a component and a semifinished product include a semiconductor, an electronic circuit, a module, and ECU (Electronic Control Unit). Examples as a finished product include a drive recorder, a car navigation system, a smart phone, a personal computer, a cellular phone, and a personal digital assistant.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program stored in a recording medium (external storage (hard disk, USB memory, CD/BD, non-transitory tangible storage medium, and the like), internal storage (RAM, ROM, and the like)) of dedicated or general-purpose hardware can also be provided from a server to the dedicated or general-purpose hardware via a communication line with or without intervention of a recording medium. As a result, the latest function can be constantly provided through upgrading of a program.

INDUSTRIAL APPLICABILITY

An electronic control unit of the present disclosure has been described as an in-vehicle electronic control unit mounted mainly in an automobile but the electronic control unit is also applicable to the whole of movable mobile units, such as motorcycles, ships, railroads, and aircrafts. Aside from mobile units, the electronic control unit is applicable to all the products including a microcomputer.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An electronic control unit comprising:
   a reception unit that receives a data frame periodically transmitted from an other electronic control unit;
   a reception interval calculation unit that calculates a reception interval between a first data frame as the data frame received by the reception unit and a second data frame received by the reception unit immediately before the first data frame;
   a storage unit that holds a determination value for determining whether the data frame is anomalous;
   a determination value updating unit that, when the reception interval is equal to or less than a threshold value, updates the determination value by adding a predetermined value to the determination value; and
   an anomaly determination unit that determines the data frame to be anomalous when the determination value exceeds a limit value.

2. The electronic control unit according to claim 1, wherein:
   the predetermined value is a difference between the reception interval and the threshold value.

3. The electronic control unit according to claim 1, wherein:
   when the reception interval is more than the threshold value, the determination value updating unit subtracts the predetermined value from the determination value.

4. The electronic control unit according to claim 1, wherein:
   when the determination value exceeds the limit value, the anomaly determination unit determines that at least one of the first data frame and a predetermined number of data frames received by the reception unit immediately before the first data frame is anomalous.

5. The electronic control unit according to claim 3, wherein:
   the anomaly determination unit determines that the data frame received by the reception unit before the determination value exceeds a second limit value after the determination value exceeds a first limit value is anomalous; and the limit value includes the second limit value and the first limit value.

6. The electronic control unit according to claim 5, wherein:
   the first limit value is different from the second limit value.

7. The electronic control unit according to claim 1, wherein:
when the anomaly determination unit determines the data frame to be anomalous, the determination value updating unit updates the determination value to be an initial value.

8. A non-transitory tangible computer readable medium comprising instructions being executed by a computer, the instructions including a computer-implemented method executed by an electronic control unit connected to an other electronic control unit via a communication network, the instructions comprising:
receiving a data frame periodically transmitted from the other electronic control unit;
calculating a reception interval between a first data frame as the data frame received and a second data frame received immediately before the first data frame;
updating a determination value for determining whether the data frame is anomalous by adding a predetermined value to the determination value when the reception interval is equal to or less than a threshold value; and
determining the data frame to be anomalous when the determination value exceeds a limit value.

9. An anomaly detection method performed by an electronic control unit connected to an other electronic control unit via a communication network, the anomaly detection method comprising:
receiving a data frame periodically transmitted from the other electronic control unit;
calculating a reception interval between a first data frame as the data frame received and a second data frame received immediately before the first data frame;
updating a determination value for determining whether the data frame is anomalous by adding a predetermined value to the determination value when the reception interval is equal to or less than a threshold value; and
determining the data frame to be anomalous when the determination value exceeds a limit value.

\* \* \* \* \*